(12) United States Patent
Renteria

(10) Patent No.: US 7,708,032 B1
(45) Date of Patent: *May 4, 2010

(54) APPARATUS AND METHOD FOR INSTALLATION OF PIPE LINER

(75) Inventor: Juan P. Renteria, Riverside, CA (US)

(73) Assignee: J.R. Pipeline Co., Inc., Perris, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/688,656

(22) Filed: Mar. 20, 2007

Related U.S. Application Data

(63) Continuation of application No. 11/358,278, filed on Feb. 21, 2006, now Pat. No. 7,191,801, which is a continuation of application No. 10/697,710, filed on Oct. 30, 2003, now Pat. No. 7,000,642.

(60) Provisional application No. 60/422,948, filed on Oct. 30, 2002.

(51) Int. Cl.
*F16L 55/16* (2006.01)

(52) U.S. Cl. .................. 138/98; 405/184.2; 156/94; 264/269

(58) Field of Classification Search .............. 138/97, 138/98; 405/184.1, 184.2; 264/269; 156/94
See application file for complete search history.

(56) References Cited

U.S. PATENT DOCUMENTS

| | | | |
|---|---|---|---|
| 1,180,714 A | 4/1916 | Hall | |
| 2,672,161 A | 3/1954 | Brauer | |
| 3,830,260 A | 8/1974 | Baviello, Sr. | |
| 3,946,761 A | 3/1976 | Thompson et al. | |
| 4,627,471 A | 12/1986 | Parkes et al. | |
| 4,671,840 A | 6/1987 | Renaud | |
| 4,728,223 A | 3/1988 | Rice | |
| 5,042,532 A | 8/1991 | Gilleland | |
| 5,066,208 A | 11/1991 | Warmerdam | |
| 5,186,215 A | 2/1993 | Gilleland | |
| 5,190,705 A | 3/1993 | Corazza | |
| 5,203,377 A | 4/1993 | Harrington | |
| 5,263,515 A | 11/1993 | Goodale | |
| 5,351,720 A | 10/1994 | Maimets | |
| 5,374,174 A | 12/1994 | Long, Jr. | |
| 5,622,571 A | 4/1997 | Derlein | |
| 5,656,117 A | 8/1997 | Wood et al. | |
| 5,674,030 A | 10/1997 | Sigel | |
| 5,709,503 A | 1/1998 | Manlow | |
| 5,817,200 A | 10/1998 | O'ffill | |
| 6,039,079 A | 3/2000 | Kiest, Jr. | |
| 6,206,993 B1 | 3/2001 | Kiest et al. | |

(Continued)

FOREIGN PATENT DOCUMENTS

DE 44 15 962 A 11/1995

*Primary Examiner*—James F Hook
(74) *Attorney, Agent, or Firm*—Knobbe, Martens, Olson & Bear, LLP

(57) ABSTRACT

An apparatus and method for lining sewer pipes that utilize an adjustable form configured to conform to the shape and dimensions of the interior of a man-entry sized pipe line. The adjustable form can be used to position a sheet of liner material immediately adjacent the inner sewer walls. An air cushion system is utilized to reduce friction and drag between the sheet of liner material and form so that the liner sheet can be easily adjusted prior to bonding to the inner walls of the pipe line.

8 Claims, 3 Drawing Sheets

U.S. PATENT DOCUMENTS

| | | |
|---|---|---|
| 6,423,258 B1 | 7/2002 | Thompson |
| 7,000,642 B2 * | 2/2006 | Renteria ...................... 138/98 |
| 7,191,801 B2 * | 3/2007 | Renteria ...................... 138/98 |
| 2002/0102136 A1 | 8/2002 | Holland |

* cited by examiner

APPARATUS AND METHOD FOR INSTALLATION OF PIPE LINER

RELATED APPLICATIONS

This application is a continuation of U.S. patent application Ser. No. 11/358,278 filed on Feb. 21, 2006, which is a continuation of U.S. patent application Ser. No. 10/697,710 filed on Oct., 30, 2003, which claims the benefit of U.S. Provisional Application No. 60/422,948, filed Oct. 30, 2002, which are hereby incorporated by reference in their entirety.

BACKGROUND OF THE INVENTION

1. Field of the Invention

This invention relates generally to an apparatus and method for installing a liner within a pipeline, and more particularly, to an apparatus and method for installing a liner in man-entry sized pipes such as underground sewer pipes and the like.

2. Description of the Related Art

Sewer pipes are typically constructed of concrete and configured to transport massive volumes of sewage on a daily basis. Most concrete sewer pipes deteriorate over time due to repeated exposures to corrosive sewer gases such as hydrogen sulfide. Corrosive sewer gas can erode the inner walls of the sewer pipes and form cracks that would allow sewer gas to escape and ground water to seep through. To address this problem, systems and methods have been developed to rehabilitate the older sewer pipes. One such method involves retrofitting the pipe with a liner on its inner surface. The liner is typically made of corrosion resistant material such as polyethylene or polyvinylchloride (PVC). A commonly used method involves applying an annular slipliner to the conduit by inserting a rigid PVC pipe into the bore of the conduit so as to provide a corrosion resistant passageway. A cement grout is usually injected into the cavity between the pipe and the conduit to affix the pipe to the conduit. However, the thickness of the pipe in conjunction with the annular gap created between the conduit and the pipe can reduce the effective diameter of the sewer passageway, which in turns reduces the amount of sewage that can be transported.

An alternative pipe liner has been recently developed to address the shortcomings associated with the above-described annular slipliners. The new pipe liner is generally comprised of a flexible sheet of material such as PVC that conforms to the contours of the inner surface of the conduit. The flexible sheet liner is typically much thinner than the annular slipliners and thus does not noticeably reduce the diameter of the sewer passageway. However, the process of applying the sheet liner to the conduit can be labor intensive as it involves positioning a relatively large sheet of liner such as PVC adjacent the inside surface of the sewer pipe and then injecting grout between the liner and the sewer wall to secure the liner to the wall. It can be appreciated that the PVC sheet is typically very heavy and therefore difficult to place and hold in position before grout is applied to bond the sheet to the pipe wall. Moreover, significant time and labor are often required to carry the heavy roll of PVC material into a man-entry sized conduit, unroll the material, and then lift the material so that it is positioned adjacent the inside surface of the conduit before grout is applied. Presently, almost the entire sheet lining process is performed manually and the inventor is not aware of any equipment that has been developed to facilitate the placement of sheet liners inside sewer pipes because the process of retrofitting sewer pipes with liner sheets is relatively new in itself.

Hence from the foregoing, it will be appreciated that there is a need for an apparatus and method that will facilitate application of a sheet liner inside a man-entry sized pipe line. To this end, this is a particular need for an apparatus or process that reduces the amount of time and labor required to apply a sheet liner to the inner walls of sewer pipes.

SUMMARY OF THE INVENTION

In one aspect, the preferred embodiments of the present invention provides an apparatus for installing a sheet of pipe liner inside a man-entry sized pipe. The apparatus comprises a form having an exterior surface adapted to position the sheet of pipe liner adjacent the inner walls of the pipe, wherein the exterior surface substantially conforms to the contours of the inner walls. The apparatus further comprises an air cushion system that reduces the friction between the sheet of pipe liner and the exterior surface of the form. In one embodiment, the air cushion system comprises a network of pipes adapted to transport pressurized air to a plurality of openings formed in the form. Preferably, the form can be extended and retracted both horizontally and vertically. In one embodiment, the form comprises an upper portion and side walls, wherein the side walls can be pivoted relative to the upper portions.

In another aspect, the preferred embodiments of the present invention provide an apparatus for installing a pipe liner inside a sewage pipe having a first cross-sectional configuration. The apparatus comprises a form having at least one movable surface which receives a flexible sheet of liner wherein the movable surface is movable between a first position and a second position, wherein the movable surface in the second position is positioned substantially adjacent the inner wall of the sewage pipe with the liner positioned substantially adjacent the inner wall of the sewage pipe. The apparatus further comprises an adhesive injection system that injects an adhesive between the liner and the inner wall of the sewage pipe to adhere the liner to the inner wall of the sewage pipe.

In one embodiment, the form comprises a plurality of curved sections that collectively define the at least one movable surface. Preferably, the plurality of curved sections are hingeably attached to each other so as to be able to expand outward so as to position the at least one movable surface adjacent the inner walls of the sewage pipe. Preferably, the cross-sectional configuration of the form with the at least one movable surface in the second position is substantially the same as the cross-sectional configuration of the inner walls of the sewage pipe. In one embodiment, the cross-sectional configuration of the form with the at least one movable surface in the second position comprises a hemispherical shape. In another embodiment, the apparatus further comprises an air cushion system that reduces the friction between the sheet of pipe liner and the movable surface of the form. In yet another embodiment, the apparatus comprises an actuation system for moving the at least one movable surface between the first position and the second position.

DETAILED DESCRIPTION OF THE PREFERRED EMBODIMENT

Figure 1:
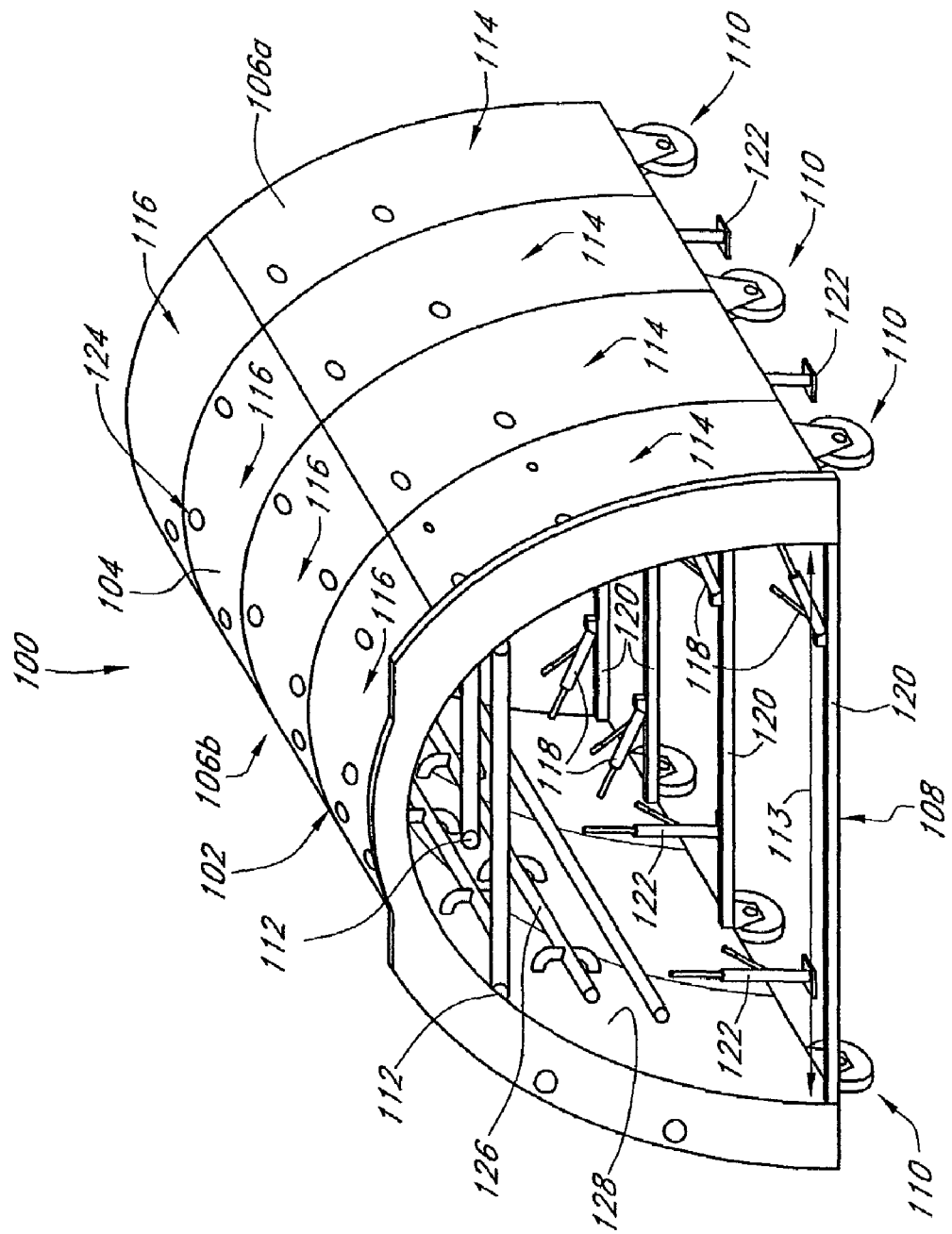
FIG. 1 schematically illustrates a pipe lining apparatus of one preferred embodiment of the present invention.

References will now be made to the drawings wherein like numerals refer to like parts throughout. FIG. 1 is a schematic illustration of one preferred embodiment of a pipe lining apparatus 100 of the present invention. In the embodiment shown in FIG. 1, the pipe lining apparatus 100 is designed to install liners in pipes that are semi-elliptical or horseshoe shaped in cross section. These semi-elliptical pipes resemble an inverted "U" in cross section and are generally typical of older sewer lines that were installed before 1960. Although the pipe lining apparatus shown in FIG. 1 is designed for rehabilitating older, semi-elliptical sewer pipes, it can be appreciated that the scope of the present invention is not limited to applying lining to these particular style of sewer pipes. Other embodiments of the invention are designed to install lining in pipes of different shapes and dimension, including but not limited to, pipes with circular cross section.

As shown in FIG. 1, the pipe lining apparatus 100 generally comprises a substantially arcuate form 102 that is configured to correspond to the general contour of a sewer pipe with a semi-elliptical cross section. The form 102 comprises an elongate upper portion 104 and a plurality of sidewalls 106a, 106b extending downwardly from the upper portion 104 in a manner so as to form a semi-elliptical shell. Preferably, the form 102 is mounted on a carriage assembly 108 having a plurality of wheels 110 that permit rolling movement of the form 102.

In one embodiment, the form 102 is comprised of individual metal panels that are connected together via a plurality of hinges 112. The panels are connected in a manner such that panels 114 comprising the sidewalls 106a, 106b can pivot relative to panels 116 comprising the upper portion 104 in a manner so as to permit the effective width 113 of the form 102 to expand or contract to conform to the cross-sectional width of the sewer pipe. In one embodiment, the form 102 can be made to expand or contract in cross-sectional width by operating a first plurality of jacks 118 in a known manner. Preferably, the first jacks 118 are adapted to retract or extend a plurality of telescoping horizontal beams 120 extending between the two side walls 106a, 106b. In one embodiment, the jacks 118 are manually operated. In another embodiment, the jacks 118 can be operated by a hydraulic system such that each jack can be activated by a push button or other device.

When the telescoping horizontal beams 120 are retracted, the hinged side wall panels 114 are pulled toward the center of the form 102, thereby decreasing cross-sectional width 113 of the form. Likewise, when the telescoping beams 120 are extended, the side wall panels 114 are pushed outwardly away from the center of the form 102, thereby increasing the cross-sectional width 113 of the form. Preferably, the side wall panels are in a retracted position when the apparatus is being moved into a sewer pipe. The side wall panels can be extended to conform to the dimension of the sewer pipe once when the form is positioned adjacent to the site where relining is to be performed. Moreover, the height of the form 102 can also be adjusted by operating a second plurality of jacks 122 which in turn will raise or lower a plurality of vertical support beams 123 of the carriage 108. In one embodiment, the jacks 122 are manually operated. In another embodiment, the jacks 122 are operated by a hydraulic system whereby each jack can be activated by a button, switch or other device.

Furthermore, as shown in FIG. 1, a plurality of openings 124 are formed in the upper portion 104 and side walls 106a, 106b of the form 102. Preferably, each opening 124 is connected to a network of pipes 126 lining the interior walls 128 of the form 102. As will be described in greater detail below, pressurized air is preferably supplied by a compressor and transported by the network of pipes 126 to the openings 124. Each opening 124 is configured to release a pre-determined amount of pressurized air, thereby creating an air cushion between the outer surface of the form 102 and the liner. This air cushion facilitates sliding movement and placement adjustment of the liner on the form. In one embodiment, the openings are about 0.25 inches in diameter and adjacent openings are spaced about 12 inches apart. In another embodiment, the openings are placed in the upper half of the form where friction and drag force between the liner and the outer surface of the form are typically the greatest when the liner is slid across the form.

Advantageously, the network of pipes are formed adjacent the internal walls of the form and configured to transport compressed air to the openings in the form. The pipe lines lead to the openings 124 formed in the walls of the form. FIG. 1 also shows the hinges 112 connecting the upper portion and side panels of the form and jacks 118 for extending and retracting the telescoping horizontal support beams.

Figure 2:
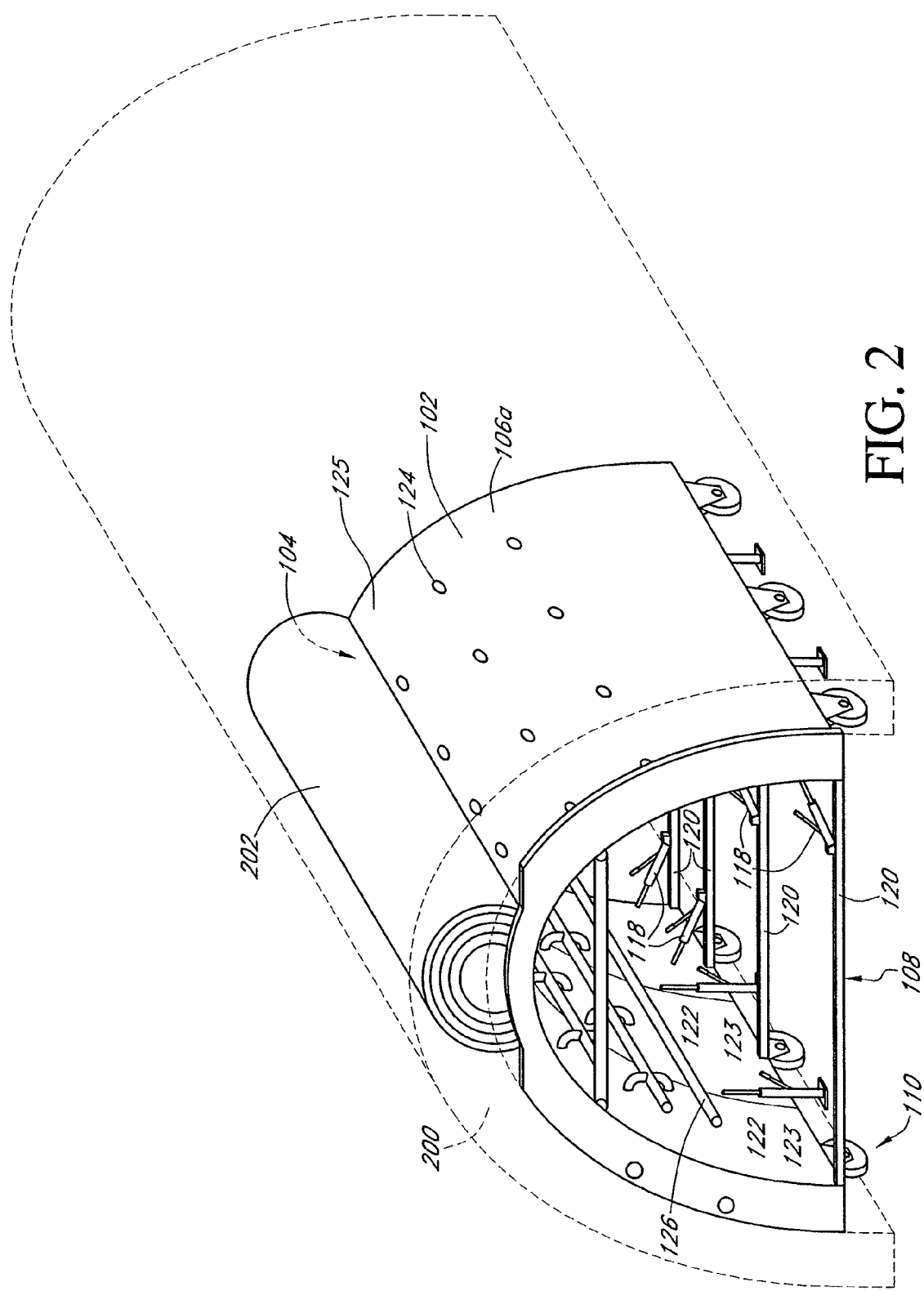
FIG. 2 schematically illustrates the pipe lining apparatus of FIG. 1 positioned inside a sewer line.

In practice, the form 102 is rolled into a man-entry sized sewer pipe 200 and positioned adjacent an area where the liner is to be applied as shown in FIG. 2. A roll of liner material 202, such as corrosion resistant PVC, is positioned longitudinally on the upper portion 104 of the form 102. Preferably, the height of the form 102 is adjusted to accommodate the thickness of the roll 202 and still provide sufficient headroom for the roll to be moved and adjusted on the form 102. Moreover, the width of the form 102 is also preferably adjusted so that operators can stand next to the side of the form 102 to properly position the liner.

Figure 3:
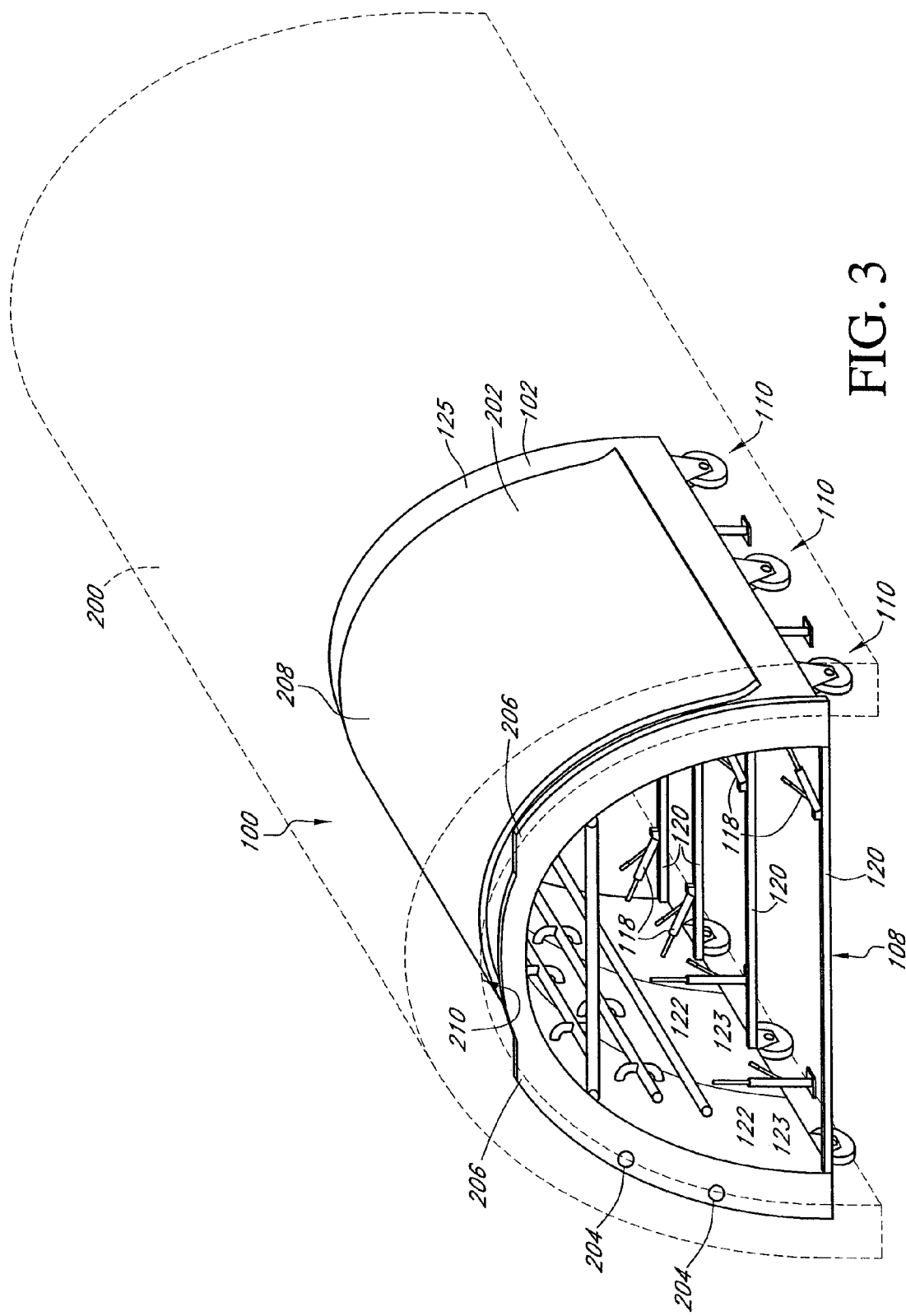
FIG. 3 schematically illustrates the pipe lining apparatus of FIG. 1 having a sheet of lining material draped over the apparatus for installation.

In one embodiment, pressurized air supplied by a compressor (not shown) and transported through the network of pipes 126 inside the form 102 is released through the openings 124 so as to form an air cushion adjacent the outer surface 125 of the form 102. Advantageously, the air cushion reduces the drag force between the liner 202 and the outer surface 125 of the form when the roll 202 is being moved or adjusted into position. Once the roll of liner material 202 is properly positioned on the upper surface 104 of the form, the liner 202 is unrolled and allowed to drape over the form 102 as shown in FIG. 3. Advantageously, the air cushion provides some lift for the liner 202 and reduces drag so as to reduce the force needed to pull the liner across the form 102.

Once the sheet of liner 202 is properly draped over the form 102, the form 102 can be raised and expanded to position the liner immediately adjacent the internal walls of the sewer pipe 200. The form 102 can be extended vertically by activating the second plurality of jacks 122 which are adapted to raise the vertical support beams 123 of the carriage 108. Similarly, the form 102 can be extended horizontally by activating the first plurality of jacks 118 which are adapted to extend the telescoping horizontal support beams 120 of the carriage 108. As the horizontal support beams 120 telescope outwardly, the hinged side panels 106a, 106b of the form are pushed toward the inner side walls of the sewer pipe.

When the liner is positioned immediately adjacent the inner walls of the sewer pipe, grout is applied to the space between the liner and the inner walls to secure the liner to the walls. In one embodiment, grout is injected through openings 204 formed in a bulkhead section 206 of the apparatus 100 and into a cavity 210 between the upper surface of the liner 208 and portions of the inner walls of the sewer pipe 200. Preferably, the bulkhead section 206 comprises a substantially planar strip of metal or other suitable material that extends outwardly from the perimeter of the form 102 in a direction substantially perpendicular from the sidewalls of the sewer pipe 200. The bulkhead section 206 is adapted to curb the flow of grout from seeping out from the cavity 210 between the inner sewer walls and the liner.

After the grout sets and firmly bonds the liner 202 to the inner sewer walls 210, the form 102 can be retracted in height and width by activating the first and second plurality of jacks 118, 122. Once retracted, the form 102 can be easily rolled to another section of the sewer pipe that require lining. In one embodiment, the wheels 110 located near the middle section of the carriage 108 can be pivoted upwardly in a manner such that the rolling surface of each wheel 110 contacts the sidewalls of the sewer pipe as the apparatus is moved along the sewer pipe. In one embodiment, the wheels can be manually pivoted or moved using a motorized system.

Advantageously, the preferred embodiments of the present invention provide a pipe lining apparatus that reduces the amount of time and labor needed to retrofit a man-entry sized sewer line. Without requiring extensive manual labor, the apparatus can be positioned inside the sewer pipe, adapted to conform to the dimensions of the pipe and position a layer of liner sheet adjacent the inner walls of the pipe. Moreover, the apparatus utilizes a unique air cushion system to reduce friction and drag so that the liner material can be easily moved and adjusted prior to lining the pipe.

Although the foregoing description of the preferred embodiment of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions.

What is claimed is:

1. An apparatus for installing a sheet of pipe liner inside a man-entry sized pipe, comprising:
   a form having an exterior surface adapted to position the sheet of pipe liner adjacent the inner walls of the pipe wherein the sheet of pipe liner directly contacts the exterior surface of the form, wherein the exterior surface substantially conforms to the contours of the inner walls;
   an air cushion system that reduces the friction between the sheet of pipe liner and the exterior surface of the form, said air cushion system provides pressurized air in the space between the exterior surface of the form and the sheet of pipe liner in a manner such that the pressurized air lifts at least a portion of the sheet of pipe liner from the exterior surface of the form so as to reduce the amount of force needed to pull the sheet of liner across the exterior surface of the form.

2. The apparatus of claim 1, wherein the form can be extended and retracted in a horizontal direction.

3. The apparatus of claim 2, wherein the form can be extended and retracted in a horizontal direction via a first plurality of jacks.

4. The apparatus of claim 3, wherein the form further comprises a plurality of telescoping horizontal beams, wherein the first plurality of jacks are adapted to extend and retract said telescoping beams.

5. The apparatus of claim 1, wherein the form can be extended and retracted in a vertical direction.

6. The apparatus of claim 5, wherein the form can be extended and retracted in a vertical direction via a second plurality of jacks.

7. The apparatus of claim 1, wherein the form further comprises a plurality of hingedly interconnected panels.

8. The apparatus of claim 7, wherein the panels are made of metal.

\* \* \* \* \*